Nov. 20, 1923.

J. F. HOWERTON

NONSKID CHAIN

Filed March 12, 1921

1,474,526

Inventor
Jeter F. Howerton
By Louis Bagger
his Attorneys

Patented Nov. 20, 1923.

1,474,526

UNITED STATES PATENT OFFICE.

JETER F. HOWERTON, OF GRAND RAPIDS, MICHIGAN.

NONSKID CHAIN.

Application filed March 12, 1921. Serial No. 451,715.

*To all whom it may concern:*

Be it known that I, JETER F. HOWERTON, a resident of Grand Rapids, in the county of Kent and State of Michigan, a citizen of the United States, have invented certain new and useful Improvements in Nonskid Chains, of which the following is a specification.

My invention relates to an improvement in non-skid chains for automobile wheels.

As the name implies, the object and function is to preclude skidding, on slippery roads and streets. This invention comprises, in addition to the usual side chains, Y-shaped cross-chains, the connecting links at the fork or dividing point of which are at a point slightly off center, so as to be a little at one side of the traction point of the tire of the wheel.

Figure 1:
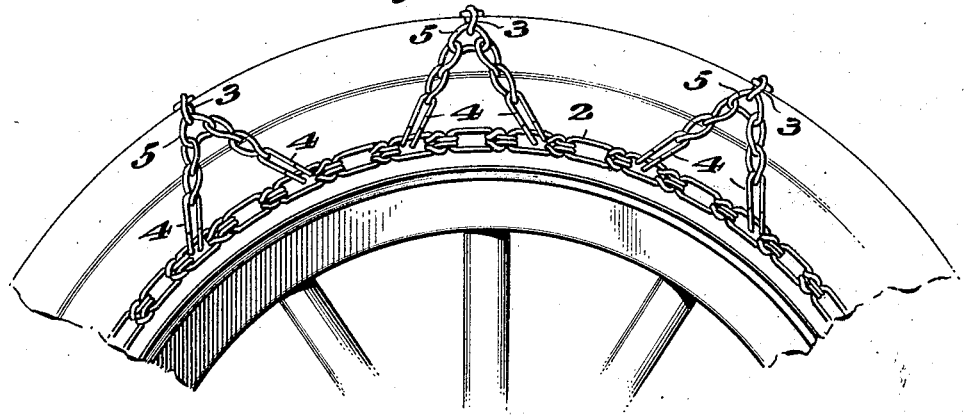
Fig. 1 is a fragmentary side elevation, showing a portion of the chain applied.
Figure 2:
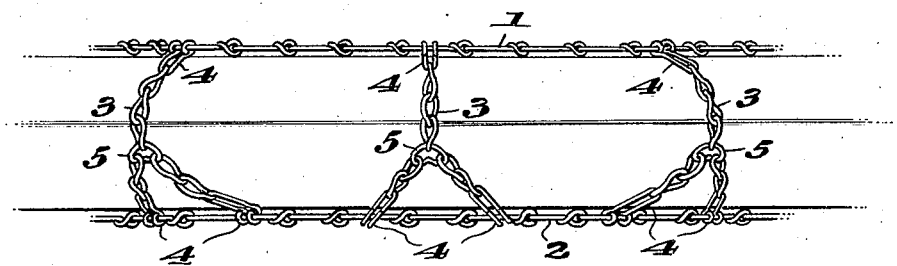
Fig. 2 is a plan view of the same.
Figure 3:
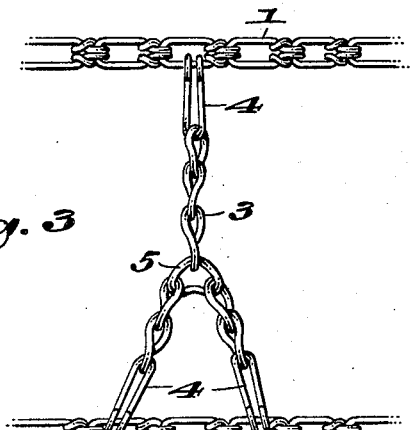
Fig. 3 is a fragmentary section of chain laid out straight.

The numerals 1 and 2 represent the inner and outer side chains, respectively, and the numeral 3 the Y-shaped connecting cross-chains, the end prongs 4 of which are attached to the links of the outer and inner side chains, and the dividing portion of the Y-shaped cross-chains being connected preferably by a heart-shaped connecting link 5 at a point a little to the outer edge, that is to say off center, so as not to come at the line of traction in the ordinary travel of the wheel, as illustrated in Fig. 1 of the drawing.

In other words, in my improved non-skid chain, the cross-chains do not cover the tread, but play over to one side, so as not to interfere with the traction of the wheel when in forward motion, but on the least inclination of the wheel to skid, the V part forming the top of the Y coming in contact with the pavement, thereby prohibiting any movement or skidding to the side.

Upon the car starting to skid or slide, the V-portion of the Y-shaped chains immediately comes into play to hold the wheel in its position through the effort of the widening prongs acting as a wedge, thus absolutely preventing the skidding either when the wheel is loose or is locked by the brakes.

I claim:

A non-skid chain including side stay chains, and Y-shaped connecting cross-chains, a heart-shaped connecting link being employed at the points of connection of the three chains forming the Y, and the length of the single chain forming the stem of the Y greater than that of the two remaining chains of the Y, whereby to draw the heart-shaped connecting link at an off-center point out of the line of traction of the travel of the wheel.

In testimony whereof I hereunto affix my signature.

JETER F. HOWERTON.